UNITED STATES PATENT OFFICE.

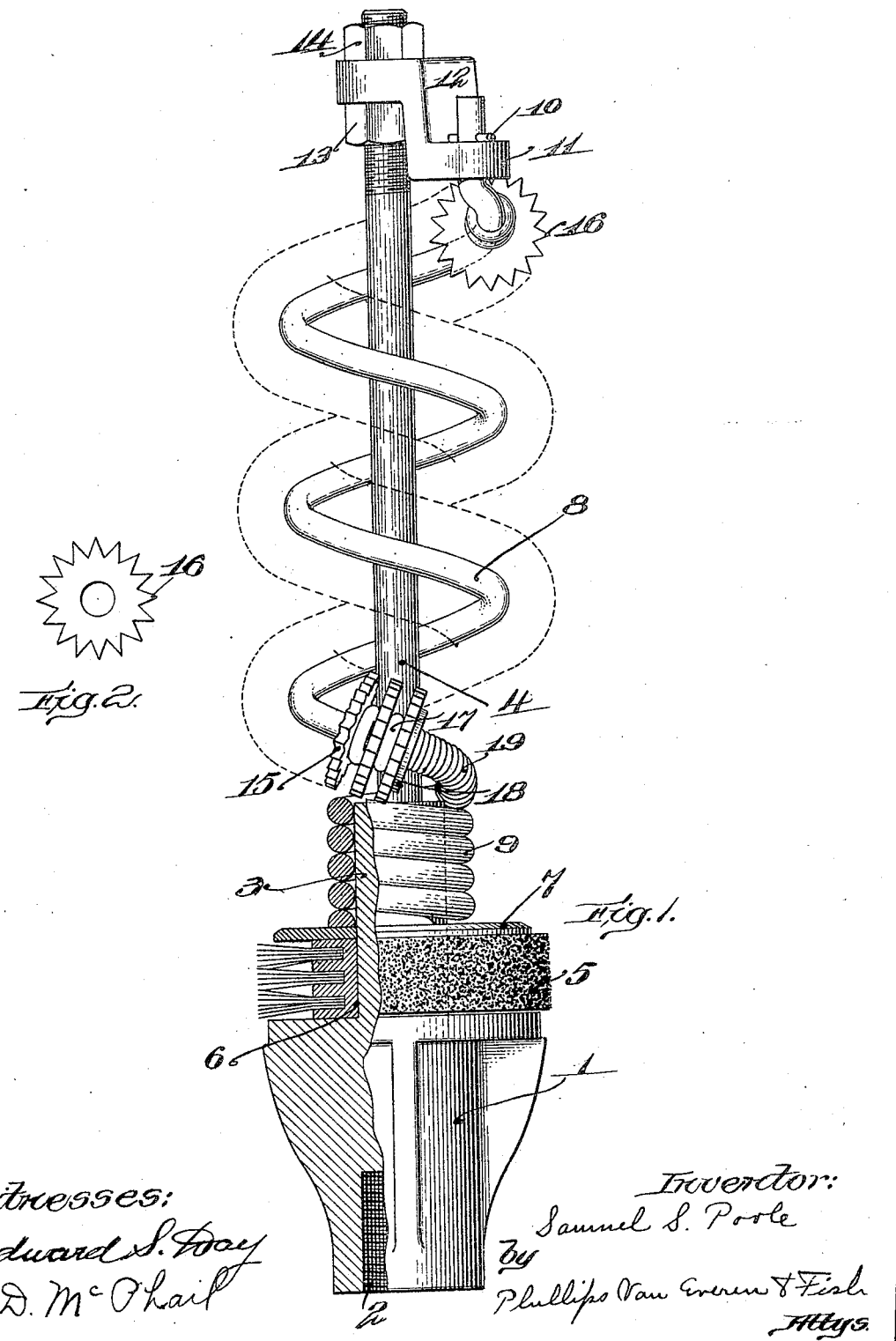

SAMUEL S. POOLE, OF ALBANY, NEW YORK.

FLUE-CLEANER.

942,515.

Specification of Letters Patent.

Patented Dec. 7, 1909.

Application filed October 14, 1908. Serial No. 457,616.

*To all whom it may concern:*

Be it known that I, SAMUEL S. POOLE, citizen of the United States, residing at Albany, in the county of Albany and State of New York, have invented certain new and useful Improvements in Flue-Cleaners; and I do hereby declare the following to be a full, clear, and exact description of the invention, such as will enable others skilled in the art to which it appertains to make and use the same.

The present invention relates to flue cleaners and it has for its object to provide for a simple and effective arrangement of the scale cutting disks or rowels whereby to greatly improve the operation, and further to provide for the ready adjustment of the head to varying diameters of flues.

To the above ends the present invention consists of the devices and combinations of devices which will be hereinafter described and claimed.

My invention is illustrated in the accompanying drawing in which:—

Figure 1 shows in partial elevation and vertical sectional view a flue cleaner embodying the invention, the spiral dotted lines indicating the continuation of the line of disks or rowels. Fig. 2 shows one of the rowels removed from the shaft.

Similar reference characters will be used throughout the specification and drawing to designate corresponding parts.

In the drawing 1 represents a block or head provided with a threaded bearing 2, whereby it may be mounted upon a rod. Projecting from the upper surface of the head 1 is a short cylindrical stem 3, which supports a rod or standard 4. The head 1 carries a circular brush 5 which has an aperture 6 through which passes the cylindrical stem 3, and the brush 5 is secured in position by a retaining washer or disk 7 also surrounding the cylindrical stem 3.

Carried by the stem 3 and the rod or standard 4 is a helical rowel support 8, which has at its lower end a sleeve or bearing 9 which surrounds the cylindrical stem 3 and bears against the washer or disk 7. The bearing 9 may be conveniently formed as shown of a closely coiled portion of the support 8. At its upper end the support 8 is fastened as by means of the cotter pin 10 in an aperture in the arm 11 of a bracket 12, which bracket is supported by the upper end of the standard 4 and held thereto by means of the nuts 13 and 14.

Upon the rowel support 8 are loosely mounted a continuous line of the disks or rowels 15, preferably provided with the chisel edge cutting teeth 16, and in order to provide for a limited independent play of the disks or rowels they are spaced apart from each other by the intermediate rings or washers 17, as clearly shown in Fig. 1 of the drawing. These rings or washers act to separate the disks or rowels and prevent them from coming in contact with each other as they are revolved during the operation of the device. The lower end of the line of disks or rowels is supported by a collar 18 and a short sleeve 19, said sleeve being preferably formed of a coil of wire and mounted upon the support 8.

It will be understood that as shown by the dotted lines in Fig. 1, there will be a continuous line of the cutting disks or rowels extending from the top to the bottom of the spiral support 8 and they are arranged to freely turn or revolve and to tip to a certain extent on said shaft support.

By means of the nuts 13 and 14 the bracket 12 may be raised or lowered upon the stem or standard 4 and thus expand or contract the convolutions of the support. If the bracket 12 be raised the convolutions will be contracted, while on the other hand a lowering of the bracket 12 will expand the convolutions and thus the diameter of the line of scale cutting disks may be adjusted within certain limits to compensate for varying diameters of the flue.

In operation the device is reciprocated back and forth through the flue to be cleaned, and the contact of the cutter disks with the surface to be cleaned causes them to be revolved about the rod or support 8. Since the rod or support on which the cutters are mounted is arranged spirally, each cutter is rotated by engagement with the surface to be cleaned about an axis which is oblique to the direction of its travel along the flue. The sharp corners of the chisel teeth, therefore, have a scraping action transverse to the direction of travel of the cutter disks along the flue, and act efficiently to break up and remove any matter deposited on the interior surface of the flue.

What is claimed is:—

1. A flue cleaner, having, in combination, a head, a spiral support having one or more convolutions carried by the head, and scale cutting disks loosely mounted on the support for rotation by engagement with the interior of a flue so arranged that they will operate upon the entire interior surface of the flue as the head is moved longitudinally through the flue, substantially as described.

2. A flue cleaner, having, in combination, a head, a spiral rod having one or more convolutions carried by the head, and toothed cutter disks loosely mounted on the rod for rotation by engagement with the interior of a flue as the head is moved longitudinally through the flue, substantially as described.

3. A flue cleaner, having, in combination, a head provided with a standard, a rod spirally arranged about the standard and having one end connected therewith, and cutter disks loosely mounted on the rod for rotation by engagement with the interior of the flue as the head is moved longitudinally through the flue, substantially as described.

4. A flue cleaner, having, in combination, a head, a spiral rod having one or more convolutions carried thereby, cutter disks loosely mounted on the rod for rotation by engagement with the interior of a flue as the head is moved longitudinally through the flue, and devices for expanding or contracting the spiral rod to vary the diameter of the spiral, substantially as described.

5. A flue cleaner, having, in combination, a head provided with a standard, a rod spirally arranged about the standard connected with the head and with the standard, cutter disks loosely mounted on the rod and spacing washers between the disks.

In testimony whereof I affix my signature, in presence of two witnesses.

SAMUEL S. POOLE.

Witnesses:
O. E. DE WITT,
STEPHEN SCHREIBER.